US008881811B2

(12) United States Patent
Reyes

(10) Patent No.: US 8,881,811 B2
(45) Date of Patent: Nov. 11, 2014

(54) ADDITIVES TO SUPPRESS SILICA SCALE BUILD-UP AND METHODS OF USE THEREOF

(75) Inventor: Enrique A. Reyes, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 711 days.

(21) Appl. No.: 12/917,167

(22) Filed: Nov. 1, 2010

(65) Prior Publication Data

US 2011/0079392 A1 Apr. 7, 2011

Related U.S. Application Data

(63) Continuation-in-part of application No. 12/574,037, filed on Oct. 6, 2009.

(60) Provisional application No. 61/104,610, filed on Oct. 10, 2008, provisional application No. 61/104,620, filed on Oct. 10, 2008, provisional application No. 61/104,624, filed on Oct. 10, 2008, provisional application No. 61/104,629, filed on Oct. 10, 2008.

(51) Int. Cl.
*E21B 43/00* (2006.01)
*C09K 8/76* (2006.01)
*C09K 8/528* (2006.01)
*C09K 8/78* (2006.01)
*C09K 8/88* (2006.01)
*E21B 37/06* (2006.01)
*E21B 43/25* (2006.01)

(52) U.S. Cl.
CPC . *C09K 8/76* (2013.01); *C09K 8/528* (2013.01); *C09K 8/78* (2013.01); *C09K 8/88* (2013.01); *E21B 37/06* (2013.01); *E21B 43/25* (2013.01)
USPC ............. 166/279; 166/300; 166/310; 166/50; 166/307

(58) Field of Classification Search
None
See application file for complete search history.

(56) References Cited

U.S. PATENT DOCUMENTS

| | | | |
|---|---|---|---|
| 3,704,750 A * | 12/1972 | Miles et al. ................... | 166/279 |
| 3,782,469 A | 1/1974 | Fulford | |
| 3,826,311 A | 7/1974 | Szabo et al. | |
| 4,231,428 A | 11/1980 | Needham et al. | |
| 4,323,124 A | 4/1982 | Swan | |
| 4,427,068 A | 1/1984 | Fitzgibbon | |
| 4,454,914 A * | 6/1984 | Watanabe ................... | 166/244.1 |
| 4,460,627 A | 7/1984 | Weaver et al. | |
| 4,476,930 A | 10/1984 | Watanabe | |
| 4,585,064 A | 4/1986 | Graham et al. | |
| 4,606,227 A | 8/1986 | Walters | |
| 4,741,400 A * | 5/1988 | Underdown ................... | 166/279 |
| 5,159,979 A | 11/1992 | Jennings, Jr. | |
| 5,277,823 A | 1/1994 | Hann et al. | |
| 5,529,125 A | 6/1996 | Di Lullo Arias et al. | |
| 5,558,171 A | 9/1996 | McGlothlin et al. | |
| 6,070,664 A | 6/2000 | Dalrymple et al. | |
| 6,153,106 A | 11/2000 | Kelley et al. | |
| 6,209,646 B1 | 4/2001 | Reddy et al. | |
| 6,311,773 B1 | 11/2001 | Todd et al. | |
| 6,461,518 B1 | 10/2002 | Demadis et al. | |
| 6,476,169 B1 | 11/2002 | Eoff et al. | |
| 6,531,427 B1 | 3/2003 | Shuchart et al. | |
| 6,547,871 B2 | 4/2003 | Chatterji et al. | |
| 6,613,899 B1 | 9/2003 | Kuzee et al. | |
| 6,877,563 B2 | 4/2005 | Todd et al. | |
| 6,906,129 B2 | 6/2005 | Watanabe et al. | |
| 7,021,383 B2 | 4/2006 | Todd et al. | |
| 7,091,159 B2 | 8/2006 | Eoff et al. | |
| 7,114,568 B2 | 10/2006 | Eoff et al. | |
| 7,159,656 B2 | 1/2007 | Eoff et al. | |
| 7,159,659 B2 | 1/2007 | Welton et al. | |
| 7,192,908 B2 | 3/2007 | Frenier et al. | |
| 7,207,387 B2 | 4/2007 | Eoff et al. | |
| 7,216,705 B2 | 5/2007 | Saini et al. | |
| 7,216,707 B2 | 5/2007 | Eoff et al. | |
| 7,220,708 B2 | 5/2007 | Zamora et al. | |
| 7,232,793 B1 | 6/2007 | King et al. | |
| 7,273,099 B2 | 9/2007 | East, Jr. et al. | |
| 7,316,787 B2 | 1/2008 | Hendel et al. | |

(Continued)

FOREIGN PATENT DOCUMENTS

| | | |
|---|---|---|
| CA | 2 198 812 | 8/1998 |
| CA | 2 509 115 A1 | 12/2005 |
| CA | 2 545 563 A1 | 11/2006 |
| CA | 2 685 832 A1 | 11/2008 |
| EP | 0082657 A2 | 6/1983 |

(Continued)

OTHER PUBLICATIONS

International Search Report and Written Opinion for PCT/GB2011/001547 dated Feb. 6, 2012.

(Continued)

*Primary Examiner* — Zakiya W Bates
*Assistant Examiner* — Silvana Runyan
(74) *Attorney, Agent, or Firm* — McDermott Will & Emery LLP; Craig W. Roddy

(57) ABSTRACT

Treatments and compounds for use in subterranean formations where surfaces may be subject to silica scale build-up. Certain embodiments pertain to utilizing silica scale control additives with remediation and stimulation treatments. One example of a suitable method of treatment includes providing an acidic treatment fluid comprising: a base fluid, an acid, and a silica scale control additive; contacting at least a portion of a subterranean formation with the acidic treatment fluid; and allowing the acidic treatment fluid to interact with silica scale buildup in the subterranean formation so that at least a portion of the silica scale buildup is removed.

13 Claims, No Drawings

(56) References Cited

U.S. PATENT DOCUMENTS

| | | | |
|---|---|---|---|
| 7,398,825 B2 | 7/2008 | Nguyen et al. | |
| 7,552,771 B2 | 6/2009 | Eoff et al. | |
| 7,563,750 B2 | 7/2009 | Eoff et al. | |
| 7,589,048 B2 | 9/2009 | Eoff et al. | |
| 7,595,283 B2 | 9/2009 | Eoff et al. | |
| 7,741,251 B2 | 6/2010 | Eoff et al. | |
| 7,759,292 B2 | 7/2010 | Eoff et al. | |
| 2003/0091467 A1 | 5/2003 | Kmec et al. | |
| 2004/0023818 A1 | 2/2004 | Nguyen et al. | |
| 2004/0074643 A1* | 4/2004 | Munoz et al. | 166/279 |
| 2004/0229756 A1 | 11/2004 | Eoff et al. | |
| 2005/0150838 A1 | 7/2005 | Duke et al. | |
| 2005/0155796 A1 | 7/2005 | Eoff et al. | |
| 2005/0194135 A1 | 9/2005 | Nguyen et al. | |
| 2005/0194140 A1 | 9/2005 | Dalrymple et al. | |
| 2005/0199396 A1 | 9/2005 | Sierra et al. | |
| 2005/0244641 A1 | 11/2005 | Vincent | |
| 2006/0065396 A1* | 3/2006 | Dawson et al. | 166/279 |
| 2006/0102345 A1 | 5/2006 | McCarthy et al. | |
| 2006/0118300 A1 | 6/2006 | Welton et al. | |
| 2006/0137875 A1 | 6/2006 | Duserhoft et al. | |
| 2006/0180309 A1 | 8/2006 | Welton et al. | |
| 2006/0180310 A1 | 8/2006 | Welton et al. | |
| 2006/0183646 A1 | 8/2006 | Welton et al. | |
| 2006/0260808 A1 | 11/2006 | Weaver et al. | |
| 2006/0266522 A1 | 11/2006 | Eoff et al. | |
| 2006/0272816 A1 | 12/2006 | Willberg et al. | |
| 2006/0283592 A1 | 12/2006 | Sierra et al. | |
| 2007/0039733 A1 | 2/2007 | Welton et al. | |
| 2007/0079965 A1 | 4/2007 | Nguyen et al. | |
| 2007/0235189 A1 | 10/2007 | Milne et al. | |
| 2007/0289781 A1 | 12/2007 | Rickman et al. | |
| 2008/0011687 A1 | 1/2008 | Campo et al. | |
| 2008/0110812 A1 | 5/2008 | Jensen et al. | |
| 2008/0132711 A1 | 6/2008 | Poelker et al. | |
| 2008/0135245 A1 | 6/2008 | Smith et al. | |
| 2008/0277620 A1 | 11/2008 | Kesavan et al. | |
| 2009/0111718 A1 | 4/2009 | Gadiyar et al. | |
| 2009/0233819 A1* | 9/2009 | Fuller et al. | 507/224 |
| 2009/0271501 A1 | 10/2009 | Shenfield et al. | |
| 2009/0291863 A1 | 11/2009 | Welton et al. | |
| 2009/0312201 A1 | 12/2009 | Huang et al. | |
| 2010/0021552 A1 | 1/2010 | Hayes et al. | |
| 2010/0089579 A1 | 4/2010 | Reyes et al. | |
| 2011/0253374 A1 | 10/2011 | Reyes et al. | |

FOREIGN PATENT DOCUMENTS

| | | |
|---|---|---|
| EP | 0459661 A1 | 12/1991 |
| FR | 2858314 | 2/2005 |
| GB | 2298440 A | 6/1996 |
| WO | WO0051945 | 9/2000 |
| WO | WO2005100007 A2 | 10/2005 |
| WO | WO2007/051167 A3 | 5/2007 |
| WO | WO2009085377 A1 | 7/2009 |
| WO | WO2010041032 A1 | 4/2010 |

OTHER PUBLICATIONS

Okoye et al, "Characterization of Formation Damage in Heavy Oil Formation During Steam Injection," SPE 19417, 1990.

Shuchart et al., "Improved Success in Acid Stimulations with a New Organic-HF System," SPE 36907, 1996.

Gdanski et al., "Advanced Sandstone Acidizing Designs Using Improved Radial Models," SPE 38597, 1997.

Stanely et al., "Matrix Acidizing Horizontal Gravel-Packed Wells for Fines Damage Removal," SPE 65519, 2000.

Wennberg et al., "Successful Mud Acid Stimulations Maintain Productivity in Gravelpacked Wells at Heidrun," SPE 68925, 2001.

Husen et al., "Chelating Agent-Based Fluids for Optimal Stimulation of High-Temperature Wells," SPE 77366, 2002.

Ali et al., "Stimulation of High-Temperature Sandstone Formations from West Africa with Chelating Agent-Based Fluids," SPE 93805, 2008.

Ali et al., "Effective Stimulation of High-Temperature Sandstone Formations in East Venezuela with a New Sandstone-Acidizing System," SPE 98318, 2006.

Xiao et al., "Reactive Transport Modeling of Carbonate and Siliciclastic Diagenesis and Reservoir Quality Prediction," SPE 101669, 2006.

Aboud et al., "Effective Matrix Acidizing in High-Temperature Environments," SPE 109818, 2007.

Falcone et al., "Oil and Gas Expertise for Geothermal Exploitation: The Need for Technology Transfer," SPE 113852, 2008.

Kerkar et al., "Assessment of Dynamic Filtration Formation Damage for Alaskan North Slope Drilling Fluids," SPE 114142, 2008.

Huang et al., "Using Nanopartide Technology to Control Formation Fines Migration," SPE 115384, 2008.

Pedenaud et al., "A New Water Treatment Scheme for Thermal Development: The SIBE Process," SPE/PS/CHOA 1117561, PS 2008-304, 2008.

Gomez et al., "Acid Stimulation of Geothermal Wells in Central America," SPE 121300, 2008.

Weaver et al., "A Study of Proppant-Formation Reactions," SPE 121465, 2009.

Neofotistou et al., "Silica Scale Inhibition by Polyaminoamide Starburst® Dendrimers," Colloids and Surfaces A: Physicochem. Eng. Aspects 242 (2004) 213-216.

Mavredaki et al., "Inhibition and Dissolution as Dual Mitigation Approaches for Colloidal Silica Fouling and Deposition in Process Water Systems: Functional Synergies," Ind. Eng. Chem. Res. (2005), 44, 7019-7026.

Demadis et al., "Solubility Enhancement of Silicate with Polyamine/Polyammonium Cationic Macromolecules: Relevance to Silica-Laden Process Waters," Ind. Eng. Chem. Res. (2006), 45, 4436-4440.

Demadis et al., "Industrial Water Systems: Problems, Challenges and Solutions for the Process Industries," 'Desalination(2007), 213, 38-46.

Demadis, et al., "Inhibitory Effects of Multicomponent, Phosphonate-Grafted, Zwitterionic Chitosan Biomacromolecules on Silicic Acid Condensation," Biomacromolecules (2008), 9, 3288-3293.

Stathoulopoulou et al., "Enhancement of Silicate Solubility by Use of 'Green' Additives: Linking Green Chemistry and Chemical Water Treatment," Desalination (2008), 224, 223-230.

Ketsetzi et al., "Being 'Green' in Chemical Water Treatment Technologies: Issues, Challenges and Developments," Desalination (2008), 223, 487-493.

Euvrard et al., "Influence of PPCA (Phosphinopolycarboxylic Acid) and DETPMP (Diethylenetriaminepentamethylenephosphonic Acid) on Silica Fouling," Desalination 205 (2007) 114-123.

Esumi et al., "Adsorption of Poly(Amidoamine) Dendrimers on Alumina/Water and Silica/Water Interfaces," Langmuir (1998), 14, 4466-4470.

Laird et al., "Elemental Recoveries for Clay Minerals Analysed by Inductively Coupled Plasma Atomic Emission Spectrometry Using Slurry Nebulisation," Journal of Analytical Atomic Spectrometry, vol. 5, (Sep. 1990).

Hamrouni et al., "Analytical Aspects of Silica in Saline Waters—Application to Desalination of Brackish Waters," Desalination 136 (2001) 225-232.

Strekopytov et al., "The Formation, Precipitation and Structural Characterisation of Hydroxyaluminosilicates in the Presence of Fluoride and Phosphate," Polyhedron 24 (2005) 1585-1592.

Azaroual et al., "Solubility of Silica Polymorphs in Eletrolyte Solutions, I. Activity Coefficient of Aqueous Silica from 25° to 250° C, Pitzer's Parameterisation," Chemical Geology 140, (1997), 155-165.

Zhou et al., "Effect of Sodium Chloride on Gelatinization of Silicic Acid and the Formation of Novel Polysilicic Acid Crystals," Journal of Non-Crystalline Solids, 353 (2007), 2774-2778.

Nour et al., "Spectroscopic Evidence of Silica-Lignin Complexes: Implications for Treatment of Non-Wood Pulp Wastewater," Water Science and Technology, vol. 50, No. 3, pp. 157-166, 2004.

Chen et al., "Influence of Catechin on Precipitation of Aluminum Hydroxide," ScienceDirect Geoderma 152 (2009), 296-300.

(56) References Cited

OTHER PUBLICATIONS

Ohman et al., "Equilibrium and Structural Studies of Silicon (IV) and Aluminum (III) in Aqueous Solution. 28. Formation of Soluble Silicic Acid-Ligand Complexes as Studied by Potentiometric and Solubility Measurements," Department of Inorganic Chemistry, University of Umea, S-901 87, pp. 335-341, 1990.

Pokrovski et al., "Experimental Study of the Complexation of Silicon and Germanium with Aqueous Organic Species: Implications for Germanium and Silicon Transport and Ge/Si Ratio in Natural Waters," Geochimica et Cosmochimica Acta, vol. 62, No. 21/22, pp. 3413-3428, 1998.

Dhar et al., "Six-Coordinate Silicon (IV). The Hydrolysis and Racemization of the Tris-(Acetylacetonato)-Silicon (IV) 201 Cation," Department of Chemistry, Wayne State University, vol. 81, 1959.

Gorrepati et al., "Silica Precipitation in Acidic Solutions: Mechanism, pH Effect, and Salt Effect," Langmuir, American Chemical Society, 2010.

Sedeh et al., "Equilibrium and Structural Studies of Silicon (IV) and Aluminum (III) in Aqueous Solution. 30. Aqueous Complexation Between Silicic Acid and Some Ortho-Di and Triphenolic Compounds," Department of Inorganic Chemistry, University of Umea, S-901 87, pp. 933-940, 1992.

Gorrepati, "Silica Precipitation from Analcime Dissolution," A Dissertation Submitted in Partial Fulfillment of the Requirements for the Degree of Doctor of Philosophy (Chemical Engineering) in the University of Michigan, 2009.

Official Action for Australian Patent Application No. 2009300847 dated Apr. 12, 2012.

Kalfayan, Leonard, "Production Enhancement with Acid Stimulation," 2000.

Kalfayan, Leonard, "Production Enhancement with Acid Stimulation," 2nd ed., 2008.

Official Action for Canadian Patent Application No. 2,738,978 dated May 29, 2012.

Office Action for U.S. Appl. No. 12/574,018 dated Jul. 7, 2011.

International Preliminary Report on Patentability for PCT/GB2009/002415 dated Apr. 21, 2011.

SPE 130641 Weaver et al., "Productivity Impact from Geochemical Degradation of Hydraulic Fractures," Society of Petroleum Engineers, 2010.

SPE 150669 Raysoni et al., "Long-Term Proppant Performance," Society of Petroleum Engineers, 2012.

SPE 118175 Nguyen et al., "Prevention of Geochemical Scaling in Hydraulically Created Fractures: Laboratory and Field Studies," Society of Petroleum Engineers, 2008.

Official Action for Mexican Patent Application No. MX/a/2013/004714 dated Jul. 21, 2014.

Official Action for Australian Patent Application 2009300846 dated Feb. 13, 2014.

Oficial Action for EP Application 09 737 117.3 dated Jan. 31, 2014.

* cited by examiner

ADDITIVES TO SUPPRESS SILICA SCALE BUILD-UP AND METHODS OF USE THEREOF

CROSS-REFERENCE TO RELATED APPLICATIONS

This application claims the benefit of U.S. Provisional Patent Application Ser. Nos. 61/104,610, 61/104,620, 61/104,624, and 61/104,629, each filed Oct. 10, 2008 and incorporated herein by reference.

This application is a continuation-in-part of U.S. patent application Ser. No. 12/574,037, filed on Oct. 6, 2009, entitled "Additives to Suppress Silica Scale Build-Up," by Reyes et al. which is related to U.S. patent application Ser. No. 12/573,999, entitled "Prevention of Water Intrusion into Particulates," by Nguyen et al., U.S. patent application Ser. No. 12/574,018, entitled "Ceramic Coated Particulates," by Reyes et al., and U.S. patent application Ser. No. 12/574,054, entitled "Geochemical Control of Fracturing Fluids," by Reyes et al., each filed on Oct. 6, 2009 and incorporated herein by reference in their entirety.

BACKGROUND

The present invention relates to treatments and compounds useful in subterranean formations, and, at least in some embodiments, to treatments and compounds for removing silica scale build-up.

Treatment fluids may be used in a variety of subterranean treatments, including, but not limited to, stimulation treatments and remedial treatments. As used herein, the term "treatment," or "treating," refers to any subterranean operation that uses a fluid in conjunction with a desired function and/or for a desired purpose. The terms "treatment," and "treating," as used herein, do not imply any particular action by the fluid or any particular component thereof. These subterranean operations include, but are not limited to, conformance treatments, hydraulic fracturing treatments, acidizing treatments, remedial treatments, scale removal and inhibition, and the like.

Acidic fluids may be present in a multitude of operations in the oil and chemical industry. Acidic fluids are often used as a treatment fluid in wells penetrating subterranean formations. Such acidic treatment fluids may be used in, for example, remedial operations or stimulation operations for oil and gas wells and hydrothermal wells. Acidic stimulation operations may use these treatment fluids in hydraulic fracturing and matrix acidizing treatments. Moreover, many treatment fluids include a water source that may incidentally contain certain amounts of acid, which may cause the treatment fluid to be at least slightly acidic. As used herein, the term "treatment fluid" refers to any fluid that may be used in an application in conjunction with a desired function and/or for a desired purpose.

These acidic treatment fluids are used in operations in subterranean formations comprising minerals, commonly clays, that are part of the native formation's mineralogy, which may react with other substances (e.g., water, minerals, treatment fluids, and the like) that reside in the subterranean formation in chemical reactions caused, at least in part, by conditions created by mechanical stresses on those minerals. These reactions are herein referred to as "stress-activated reactions" or "stress-activated reactivity." One type of these stress-activated reactions may be diageneous reactions. As used herein, the terms "diageneous reactions," "diageneous reactivity," and "diagenesis" include chemical and/or physical processes that, in the presence of water, move a portion of the mineral in a subterranean formation and/or convert a portion of the mineral in a subterranean formation into some other form. A mineral that has been so moved or converted is herein referred to as a "diageneous product" or "diagenic product." Any subterranean formation comprising a mineral may be susceptible to these diageneous reactions, including natural silicate minerals (e.g., quartz), man-made silicates and glass materials, metal oxide minerals (both natural and man-made), and the like.

Silica (silicon dioxide) appears naturally in a number of crystalline and amorphous forms, all of which are sparingly soluble in water; thus leading to the formation of undesirable deposits. Silicates can be salts derived from silica or the silicic acids, especially orthosilicates and metasilicates, which may combine to form polysilicates. Silica solubility depends on a number of factors including, but not limited to, pH, temperature, and ionic composition. Most silicates, except the alkali silicates, are sparingly soluble in water. A number of different forms of silica and silicate salt deposits are possible, and formation of deposits depends, among other factors, on the temperature and pH of the water. Silica build-up may readily adhere to any surface that it contacts, including the surfaces of the well bore and/or any equipment utilized during the subterranean operation. If a sufficient amount of silica build-up adheres to surfaces in the well bore or the equipment, it may, among other problems, prevent fluid circulation, or otherwise impede the effectiveness of a treatment. In addition, the precipitation and gelation of amorphous silica during an acidizing treatment can result in plugging of pores, thereby resulting in a porosity decrease that can be detrimental to production operations.

Existing methods of managing these silica build-up problems can be problematic. Some of these methods involve using additional acid to dissolve the silica build-up (e.g., amorphous silica or gelled silica) during a matrix acidizing treatment. The processes of dissolving aluminosilicate and silicate minerals, mainly clay minerals or silica scale, typically involve using acids such as HF or HCl alone or in combination with other acids including organic acids or any other suitable strong acid such as, for example, fluoroboric acid, methanesulfonic acid, chloroacetic acid, hexafluorophosphoric acid, phosphoric acid, hexafluorotitanic acid, and fluorophosphoric acid. A difficulty encountered with the use of additional acidic fluids is determining the type of subterranean formation in which they may function effectively. For instance, formations comprising high pressures, high temperatures, and/or certain minerals cannot be treated with excess acid without undesirable damage. Moreover, the introduction of additional acid may increase the complexity and cost of the subterranean treatment.

SUMMARY

The present invention relates to treatments and compounds useful in subterranean formations, and, at least in some embodiments, to treatments and compounds for removing silica scale build-up.

In one embodiment, the present invention provides a method comprising: providing a treatment fluid comprising a base fluid and a silica scale control additive; introducing the treatment fluid into at least a portion of a subterranean formation; and allowing the silica scale control additive to suppress precipitation in the subterranean formation.

In one embodiment, the present invention provides a method comprising: providing an acidic treatment fluid comprising: a base fluid, an acid, and a silica scale control additive; contacting at least a portion of a subterranean formation with the acidic treatment fluid; and allowing the acidic treatment fluid to interact with silica scale buildup in the subterranean formation so that at least a portion of the silica scale buildup is removed.

In one embodiment, the present invention provides a method for reducing silica scale buildup in a subterranean formation, the method comprising: placing an acidic treatment fluid comprising a base fluid and a silica scale control additive in the subterranean formation to form soluble silica.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to treatments and compounds useful in subterranean formations, and, at least in some embodiments, to treatments and compounds for removing silica scale build-up.

There are many advantages of the present invention, only some of which are mentioned herein. One advantage of the methods disclosed herein may be the suppression of silica scale build-up within a subterranean formation, including in the rock itself, fractures within the rock, on equipment found in the subterranean formation, and/or a well bore penetrating the subterranean formation. Without limiting the invention to a particular theory or mechanism, it is nonetheless currently believed that silica scale build-up, most likely due to silicon dissolution from the naturally occurring minerals in the formation, negatively affects the formation and production yield from the formation. High pressure and high temperature formations are believed to be even more susceptible to such silica build-up. The precipitation of silica as amorphous silica, or gelling silica, colloidal silica, etc. from the original silicic acid and polysilicic acid species may be generated from certain precursor species depending on the specific treatment. For example, precursors to silica scale may be produced from dissolution of aluminosilicate or silicate minerals. The specific type of silica produced may depend, among other things, on the type of acid used. The silicon may dissolve in fluids (e.g., formation fluids or treatment fluids), which negatively impacts their use. The dissolved silicon may then precipitate in various forms to create silica scale buildup within the subterranean formation. Such silica scale may have a tendency to form or collect on the surface of the subterranean formation, in the interstitial spaces of the particulate pack, on the equipment used in the subterranean formation (e.g. pipes and tubulars), or on the walls of a well bore, which may damage the formation and reduce its permeability over time.

As used herein, the term "pack" or "particulate pack" refers to a collection of particulates within an enclosed volume, wherein the particulates may be juxtaposed and/or in contact with one another, and wherein pore spaces may be disposed between the particulates. Examples of "packs" may include "proppant packs," which may refer to a collection of proppant particulates within a fracture, and/or "gravel packs," which may refer to a grouping of particulates that are packed sufficiently close together so as to prevent the passage of certain materials through the pack. As used herein, the terms "particle," "particulate," "proppant particulate," and "gravel" are all used to refer to either a single particle or a plurality of particles which may be used for supporting a fracture in an underground formation, for forming a proppant pack, or for use in forming a gravel pack. Such particles may be disposed in a subterranean formation, including in spaces in the rock itself, fractures within the rock, and/or a well bore penetrating the subterranean formation. As such, the suppression or inhibition of silicon dissolution and silica scale build-up may be able to reduce the permeability loss in the subterranean formation, thereby increasing the ultimate productivity of the well. Removal of such silica scale build-up commonly involves harsh acidic treatments which can further damage the formation and lead to decreased production.

The current invention provides improved methods of controlling silica scale build-up without damaging the formation. The compositions and methods of the present invention may be especially advantageous for acid-sensitive subterranean formations.

In an embodiment, the treatment fluids of the present invention may comprise a base fluid and a silica scale control additive to suppress silica scale build-up by mitigating, inhibiting, or suppressing the formation and build-up of silica (also known as silica scale). Silica scale control additives may decrease the amount of silica scale build-up on the surface of the subterranean formation, within a particulate pack, on the well bore, and/or on equipment within the subterranean formation. Silica scale control additives may increase the amount of soluble silica within a treatment solution. One of ordinary skill in the art, with the benefit of this disclosure, will know that maintaining the soluble silica at a concentration in the treatment solution of about 500 mg/L or more by weight after treatment would minimize damage caused to the formation by the precipitates. Without intending to be limited by theory, it is believed that the silica scale control additives inhibit the polymerization and build-up of silicic acid and colloidal silica by disrupting chain propagation. Furthermore, again without wishing to be limited by theory, the silica scale control additives may also function by retarding the scale build-up process, crystal growth and attachment or seeding process thereby allowing for smaller particles and particulates to be transported out of the formation, matrix, or fracture via the wellbore.

Protecting the subterranean formation as well as the subterranean equipment (e.g., pipes and tubulars) from such damage may be achieved in several ways. For example, in an embodiment, a silica scale control additive may be added to a subterranean treatment fluid.

As used herein, the term "silica scale control additive" may be any product capable of suppressing silica scale build-up by increasing the solubility of silica in solution, inhibiting silica polymer chain propagation, and/or decreasing the size or quantity of any silica scale created in a solution. The silica scale control additive may suppress silica scale build-up by increasing the solubility of silica within the formation while simultaneously preventing large build-ups of silica scale. Various silica scale control additives may be used to limit the silica scale formation, as discussed in more detail below.

The treatment fluids of the present invention may be useful in a wide variety of subterranean treatment operations in which acidic treatment fluids may be suitable. The methods and treatment fluids of the present invention may be used during or in preparation for any subterranean operation wherein a fluid may be used. Suitable subterranean operations may include, but are not limited to, acidizing operations, stimulation operations, remedial operations and any other suitable operations where a treatment fluid of the present invention may be useful.

In some embodiments, methods of the present invention comprise providing a treatment fluid comprising a base fluid and a silica scale control additive, introducing the treatment fluid into at least a portion of a subterranean formation, and allowing the silica scale control additive to suppress precipitation in the subterranean formation.

In some embodiments, the methods of the present invention comprise providing an acidic treatment fluid, contacting at least a portion of a subterranean formation with the acidic treatment fluid, and allowing the acidic treatment fluid to interact with silica scale buildup in the subterranean formation so that at least a portion of the silica scale buildup is removed. The acidic treatment fluid comprises a base fluid, an acid and a silica scale control additive.

In some embodiments, the methods for reducing silica scale buildup in a subterranean formation comprise placing an acidic treatment fluid comprising a base fluid and a silica scale control additive in a subterranean formation to form soluble silica.

The treatment fluids of the present invention may comprise a base fluid. In certain embodiments, the base fluid may be an aqueous-based fluid, a hydrocarbon-based fluid (e.g., kerosene, xylene, toluene, diesel, oils, etc.), an emulsion, a gel, a foamed fluid (e.g., a liquid that comprises a gas), combinations thereof or derivatives thereof. As used herein, the term "foamed" also refers to fluids such as co-mingled fluids. In certain embodiments, it may be desirable that the base fluid is foamed to, inter alia, reduce the amount of base fluid that is required, e.g., in water sensitive subterranean formations, to reduce fluid loss to the subterranean formation, and/or to provide enhanced proppant suspension. The term "gel," as used herein and its derivatives refer to a viscoelastic or semi-solid, jelly-like state assumed by some colloidal dispersions. Aqueous base fluids that may be suitable for use in certain embodiments of the treatment fluids of the present invention may comprise fresh water, saltwater (e.g., water containing one or more salts dissolved therein), brine, seawater, or combinations thereof. Generally, the water may be from any source, provided that it does not contain components that might adversely affect the stability and/or performance of the treatment fluids of the present invention.

In some embodiments, the treatment fluid can further comprise a chelating agent. The addition of chelating agents such as, for example, HEDTA, citric acid, glycolic acid, NTA (nitroloacetic acid), tartaric acid, lactic acid, and the like (see U.S. Pat. Nos. 6,531,427 and 7,192,908) is greatly advantageous to the effectiveness of the treatment procedure since these chelating agents can complex metal ions that would otherwise precipitate due to changes in ionic strength, pH, and competing equilibria among the ionic species.

In an embodiment, a silica scale control additive may be any compound which controls the formation of scale to some degree and does not negatively react with the formation, a treatment fluid, a formation fluid, the equipment, particulates or any other aspect of the subterranean environment. In an embodiment, suitable silica scale control additives may include polyaminoamide dendrimers and polyethyleneimine, which may be combined with carboxymethylinulin and polyacrylates. In an alternative embodiment, polyallylamines, copolymers of polyacrylamides, and polyallyldimethylammonium chloride may also be used as silica scale control additives. Examples of suitable silica scale control additives include "ACUMER 5000," commercially available from Rohm and Hass of Philadelphia, Pa.; and "Cla-Sta® XP" and "Cla-Sta® FS" available from Halliburton Energy Services, Inc. of Duncan, Okla.

In some embodiments, the amount of silica scale control additive may be any amount necessary to control silica and silicate deposition in the system being treated. In some embodiments, a silica scale control additive may be added to a treatment fluid (e.g., an acidizing fluid, a fracturing fluid, a stimulation fluid, etc.) in an amount sufficient to suppress silica scale build-up by inhibiting the formation of silica scale. In some embodiments, a silica scale control additive may be added to a treatment fluid in an amount sufficient to remove existing silica scale buildup from a subterranean formation. In an embodiment, the amount may be any amount sufficient to obtain a retained permeability in a subterranean formation of at least about 90%, the measurement of which is described in more detail below. In an embodiment, the silica scale control additive has a concentration in the base fluid ranging between about 0.01% and about 15% by weight. In some embodiments, the concentration may range from about 0.1% to about 5% by weight.

In addition, the pH of the base fluid may also have an impact on the effectiveness of the silica scale control additive. In some embodiments, the pH of the base fluid is less than or equal to about 4.5. In other embodiments, the pH of the base fluid is less than or equal to about 4.0, or less than or equal to about 3.5, or less than or equal to about 3.0, or less than or equal to about 2.5, or less than or equal to about 2.0, or less than or equal to about 1.5, or less than or equal to about 1.0. In some embodiments, the pH of the base fluid is between about 0 and about 4.5. In other embodiments, the pH of the base fluid is between about 1.0 and about 4.0, or between about 3.5 and about 1.0, or between about 3.0 and about 1.0. In some embodiments, the pH of the base fluid is above 0 and less than 4.0. In other embodiments, the pH of the base fluid is above 0 and less than 3.5, or above 0 and less than 3.0, or above 0 and less than 2.5, or above 0 and less than 2.0, or above 0 and less than 1.5, or above 0 and less than 1.

Silica scale control additives may be added to a subterranean formation before, after, or during the subterranean operation. In some embodiments, the silica scale control additive may be added to a treatment fluid and carried with the treatment fluid during a subterranean operation. In certain embodiments, the silica scale control additive may be added to a treatment fluid during a remedial operation. In such embodiments, the silica scale control additive may be added to the formation after the placement and setting of a particulate pack and/or after the formation of silica scale build-up on the surface of the subterranean formation. In such embodiments, a remedial fluid may be used to carry the silica scale control additive into the well bore and through a particulate pack. By way of example, a particulate pack may be contacted by a silica scale control additive. This technique also may be used as a subsequent treatment method to periodically treat the particulate pack over time, among other purposes, in order to maintain permeability in the particulate pack.

In certain embodiments, the treatment fluids of the present invention also may comprise any additional additive that may be suitable in a particular application. Such additional additives include, without limitation, acids, pH control additives, hydrate inhibitors, clay stabilizers, salt substitutes (e.g., tetramethyl ammonium chloride), relative permeability modifiers (e.g., HPT-1™ chemical additive available from Halliburton Energy Services, Inc. of Duncan, Okla.), sulfide scavengers, fibers, nanoparticles, consolidating agents (such as resins and/or tackifiers), corrosion inhibitors, corrosion inhibitor intensifiers, surfactants, breakers, fluid loss control additives, additional scale inhibitors, salts, bactericides, crosslinkers, stabilizers, chelators, foamers, defoamers, emulsifiers, demulsifiers, iron control agents, solvents, mutual solvents, particulate diverters, gas phase, carbon dioxide, nitrogen, other biopolymers, synthetic polymers, friction reducers, combinations thereof, or the like. The treatment fluids of the present invention also may include other additives that may be suitable for a given application, as will be recognized by a person of ordinary skill in the art, with the benefit of this disclosure.

In an embodiment, the treatment fluids of the present invention may comprise an acid, which may comprise any known acid, including but not limited to the acid already included in the acidic treatment fluids of the present invention. Examples of acids that may be suitable include, but are not limited to, hydrochloric acid, hydrofluoric acid, acetic acid, formic acid, citric acid, lactic acid, glycolic acid, sulfamic acid, tartaric acid, methanesulfonic acid, trichloroacetic acid, dichloroacetic acid, chloroacetic acid, fluoroboric acid, fluorophosphoric acid, hexafluorotitanic acid, fluorophosphoric acid, phosphoric acid, any combinations thereof, and any derivatives thereof. The term "derivative" is defined herein to include any compound that is made from one of the listed compounds, for example, by replacing one atom in the listed compound with another atom or group of atoms, rearranging two or more atoms in the listed compound, ionizing one of the listed compounds, or creating a salt of one of the listed compounds. A derivative of a material may include, but is not limited to, a compound composition based on a plurality of base materials, a composite material, or an aggregated material of various compositions. Examples of suitable acid compositions may comprise an acid, an acid generating compound, and combinations thereof. Any known acid may be suitable for use with the treatment fluids of the present invention. Examples of acids that may be suitable for use in the present invention include, but are not limited to, organic acids (e.g., formic acids, acetic acids, carbonic acids, citric acids, glycolic acids, lactic acids, p-toluenesulfonic acid, ethylenediaminetetraacetic acid ("EDTA"), hydroxyethyl ethylenediamine triacetic acid ("HEDTA"), and the like), inorganic acids (e.g., hydrochloric acid, hydrofluoric acid, phosphonic acid, phosphoric acid, fluorophosphoric acid, and the like), and combinations thereof.

Examples of acid generating compounds that may be suitable for use in the present invention include, but are not limited to, esters, aliphatic polyesters, ortho esters, which may also be known as ortho ethers, poly (ortho esters), which may also be known as poly(ortho ethers), poly(lactides), poly (glycolides), poly($\epsilon$-caprolactones), poly(hydroxybutyrates), poly(anhydrides), or copolymers thereof. Derivatives and combinations also may be suitable. The term "copolymer" as used herein is not limited to the combination of two polymers, but includes any combination of polymers, e.g., terpolymers and the like. Other suitable acid-generating compounds include esters including, but not limited to, ethylene glycol monoformate, ethylene glycol diformate, diethylene glycol diformate, glyceryl monoformate, glyceryl diformate, glyceryl triformate, triethylene glycol diformate and formate esters of pentaerythritol. An example of a suitable acid generating compound is a citrate ester commercially available from Halliburton Energy Services, Inc. of Duncan, Okla., under the tradename "MATRIXFLO II" Breaker. Other suitable materials may be disclosed in U.S. Pat. Nos. 6,877,563 and 7,021,383, the entire disclosures of which are incorporated by reference.

The choice of base fluid, acid and silica scale control additive may be chosen vis-a-vis the other, among other reasons, so that the proper synergistic effect is achieved. The concentration and type of acid selected may be based upon the function of the acid (e.g., scale removal, fracture acidizing, matrix acidizing, removal of fluid loss filter cakes and pills, and the like), compatibility with crude oil, and the mineralogy and temperature of the formation. For example, organic acids may be more commonly chosen for subterranean formation with temperatures above 200° F. whereas inorganic acids, such as hydrofluoric acid, may be more commonly chosen for subterranean formation with temperatures below 200° F. One should be mindful that certain concentrations of acids may have a tendency to damage the subterranean formation. Without wishing to be limited by theory, if an acid generating compound is added with a silica scale control agent then one may be able to delay the formation of acid (e.g., hydrofluoric acid) in the subterranean formation. This delay may result from the silica scale control additive causing growth inhibition of the silicic acid and thereby trapping the fluoride in the oligomers of silicic acid which in turn may lead to a slowing of the hydrolysis of the Si—F bond and therefore the slower production of acid within the subterranean formation. This may be advantageous in formations that are highly sensitive to acid.

In some embodiments, the treatment fluids of the present invention may further comprise surfactants, e.g., to improve the compatibility of the treatment fluids with other fluids (like any formation fluids) that may be present in the subterranean formation. A person of ordinary skill, with the benefit of this disclosure, will be able to identify the type of surfactant as well as the appropriate concentration of surfactant to be used. Examples of surfactants that may be suitable include, but are not limited to, ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates (e.g., as described in U.S. Patent Application Publication Nos. 2006/0180310, 2006/0180309 and 2006/0183646 and U.S. Pat. No. 7,159,659, the entire disclosures of which are all incorporated herein by reference), hydrolyzed keratin (e.g., as described in U.S. Pat. No. 6,547,871, the entire disclosure of which is incorporated herein by reference), sulfosuccinates, taurates, amine oxides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and mixtures thereof. Suitable surfactants may be used in a liquid or powder form. Where used, the surfactants are present in the treatment fluid in an amount sufficient to prevent incompatibility with formation fluids or well bore fluids. In an embodiment where liquid surfactants are used, the surfactants may be present in an amount in the range of from about 0.01% to about 5.0% by volume of the treatment fluid. In one embodiment, the liquid surfactants are present in an amount in the range of from about 0.01% to about 2.0% by volume of the treatment fluid. In embodiments where powdered surfactants are used, the surfactants may be present in an amount in the range of from about 0.001% to about 0.5% by weight of the treatment fluid. It may be beneficial to add a surfactant to a treatment fluid of the present invention as that fluid is being pumped downhole, among other things, to help reduce the possibility of forming emulsions with the formation crude oil. Furthermore, in some embodiments, microemulsion additives optionally may be included in the treatment fluids of the present invention.

While typically not required, the treatment fluids of the present invention also may comprise compatible breakers capable of reducing the viscosity of the treatment fluid at a desired time. Examples of such breakers that may be suitable for the treatment fluids of the present invention include, but are not limited to, sodium chlorite, hypochlorites, perborates, peroxides (including organic peroxides), enzymes, derivatives thereof, and combinations thereof. Other suitable breakers may include suitable acids. Examples of peroxides that may be suitable include, for example, tert-butyl hydroperoxide and tert-amyl hydroperoxide. A breaker may be included in a treatment fluid of the present invention in an amount and form sufficient to achieve the desired viscosity reduction at a desired time. The breaker may be formulated to provide a delayed break, if desired, without interference with or degradation of the silica scale control additive. For example, a suitable breaker may be encapsulated if desired. Suitable encapsulation methods are known to those skilled in the art. One suitable encapsulation method that may be used involves coating the breaker(s) with a material that will degrade when placed downhole so as to release the breaker at the appropriate time. The term "coating" as used herein refers to at least a partial coating of some or all of the particulates. Neither complete nor substantial coverage of the particulates or mix of particulates is implied by the term "coating." Rather, a particulate may be coated if it has, for example, at least a partial coating. Coating materials that may be suitable include, but are not limited to, polymeric materials that will degrade when downhole. The terms "degrade," "degradation," or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, among other things, a chemical or thermal reaction or a reaction induced by radiation. Suitable examples of materials that can undergo such degradation include polysaccharides such as dextran or cellulose, chitins, chitosans, proteins, aliphatic polyesters, poly(lactides), poly(glycolides), poly($\epsilon$-caprolactones), poly(hydroxybutyrates), poly(anhydrides), aliphatic polycarbonates, orthoesters, poly(orthoesters), poly(amino acids), poly(ethylene oxides), polyphosphazenes, derivatives thereof, and any combinations thereof. If used, a breaker should be included in a composition of the present invention in an amount sufficient to facilitate the desired reduction in viscosity in a treatment fluid. For instance, peroxide concentrations that may be used vary from about 0.1 to about 10 gallons of peroxide per 1000 gallons of the treatment fluid.

Optionally, a treatment fluid of the present invention may further comprise an activator or a retarder to optimize the rate at which the fluid is "broken" (i.e., the viscosity of the fluid is reduced). Any known activator or retarder that is compatible with the fluid and the components thereof is suitable for use in the present invention. Examples of such activators that may be suitable include, but are not limited to, acid generating materials, chelated iron, copper, cobalt, reducing sugars, derivatives thereof, and combinations thereof. Examples of retarders that may be suitable include sodium thiosulfate and diethylene triamine. In some embodiments, the sodium thiosulfate may be used in a range of from about 1 to about 100 lbs per 1000 gallons of acidic treatment fluid. A preferred concentration range may be from about 5 to about 20 lbs per 1000 gallons. A person of ordinary skill with the benefit of this disclosure will be able to identify a suitable activator or retarder and the proper concentration of such activator or retarder for a given application.

The treatment fluids of the present invention also may further comprise suitable fluid loss control agents. Such fluid loss control agents may be useful, among other instances, when a treatment fluid of the present invention is being used in a stimulation application. Any fluid loss agent that is compatible with the treatment fluid may be suitable for use in the present invention. Examples include, but are not limited to, starches and diesel dispersed in a fluid. Other examples of fluid loss control additives that may be suitable are those that comprise a degradable material. Suitable degradable materials include degradable polymers. Specific examples of suitable polymers include polysaccharides such as dextran or cellulose, chitins, chitosans, proteins, aliphatic polyesters, poly(lactides), poly(glycolides), poly(glycolide-co-lactides), poly($\epsilon$-caprolactones), poly(3-hydroxybutyrates), poly(3-hydroxybutyrate-co-hydroxyvalerates), poly(anhydrides), aliphatic poly(carbonates), poly(orthoesters), poly(amino acids), poly(ethylene oxides), poly(phosphazenes), derivatives thereof, and any combinations thereof. If included, a fluid loss additive can be added to a treatment fluid of the present invention in an amount of about 5 to about 2000 pounds per 1000 gallons of the treatment fluid in some embodiments. In certain embodiments, the fluid loss additive may be included in an amount from about 10 to about 50 pounds per 1000 gallons of the treatment fluid. For some liquid additives like diesel, these may be included in an amount from about 0.01% to about 20% by volume, and, in some embodiments, these may be included in an amount from about 1% to about 10% by volume.

Salts optionally may be included in the treatment fluids of the present invention for many purposes, including adjusting the density of the fluid. One of ordinary skill in the art with the benefit of this disclosure will recognize the particular type of salt appropriate for particular application, given considerations such as protection of the formation, the presence or absence of reactive clays in the formation adjacent to the well bore, compatibility with the other treatment fluid additives, and the factors affecting wellhead control. To determine whether a salt may be used, a compatibility test may be performed to identify potential compatibility problems. From such tests, one of ordinary skill in the art with the benefit of this disclosure will be able to determine whether a salt should be included in a treatment fluid of the present invention, as well as the appropriate selection of salts. Suitable salts may include, but are not limited to, calcium bromide, zinc bromide, calcium chloride, sodium chloride, sodium bromide, potassium bromide, potassium chloride, sodium nitrate, sodium formate, potassium formate, cesium formate, magnesium chloride, ammonium chloride, derivatives thereof, mixtures thereof, and the like.

The treatment fluids of the present invention optionally may comprise a stabilizer, for example, if a chosen treatment fluid of the present invention is experiencing a viscosity degradation. One example of a situation where a stabilizer might be beneficial is where the borehole temperature of the well bore is sufficient by itself to break the treatment fluid. Suitable stabilizers may include, but are not limited to, sodium thiosulfate. Such stabilizers may be useful, for example, when the treatment fluids of the present invention are utilized in a subterranean formation having a temperature above about 150° F. If included, a stabilizer may be added in an amount from about 1 lb to about 50 lbs per 1000 gal of acidic treatment fluid, in some embodiments. In other embodiments, a stabilizer may be included in an amount of from about 5 to about 20 lbs per 1000 gal of acidic treatment fluid.

An embodiment of the present invention provides a method comprising: providing a treatment fluid that comprises an aqueous base fluid, an acid, and a silica scale control additive; and introducing the treatment fluid into a portion of a subterranean formation.

An embodiment of the present invention provides a method of acidizing a portion of a subterranean formation comprising: providing a treatment fluid that comprises a base fluid, an acid, and a silica scale control additive; contacting a portion of the subterranean formation with the treatment fluid; and allowing the treatment fluid to interact with silica scale build-up in the subterranean formation so that at least a portion of the silica scale build-up is reduced.

Yet another embodiment of the present invention provides a method of remediating a portion of a subterranean formation comprising: providing a remedial treatment fluid that comprises a base fluid, an acid, and a silica scale control additive; introducing the remedial treatment fluid into the subterranean formation; and allowing the silica scale control additive to suppress silica scale build-up in the subterranean formation.

In one embodiment of the present invention, this may include treating a surface of the formation and/or a pipe with a diffusion barrier which acts to impede their interaction with aqueous fluids in the formation. As used herein, the term "diffusion barrier" includes any sort of material, including a coating, on or proximate to a subterranean formation that impedes and/or prevents aqueous fluid interaction with the subterranean formation. For example, some diffusion barriers fill or coat pores, voids, crevices, cracks, or channels at or near the formation to impede and/or prevent infiltration by the aqueous fluid. As used herein, the terms "pores," "voids," "crevices," "cracks," and "channels" refer to features at or near the surface of a formation. Any given surface of the subterranean formation may have one or more pores, voids, crevices, cracks, or channels, or may be free of such features. One or more such features may be generally referred to as "surface features." The use of the terms in conjunction is in no way intended to indicate that all three must be present simultaneously, or at all, in order for the teachings of the present invention to apply. As another example, some diffusion barriers impede and/or prevent diagensis. As used herein, the term "aqueous fluid interaction" includes a variety of possible interactions between an aqueous fluid and a particulate. Such interactions may include infiltration of the aqueous fluid into the particulate, for example, by infiltrating pores, voids, crevices, cracks, and/or channels at or near the surface of the particulate. Such interactions may also include diagenesis. The diffusion barrier may comprise one of several types of materials, including hydrophobic materials, diagenic protective materials, and various polymeric compositions. As used herein, the term "diagenic protective materials" refers to one or more diagenic products that may be selectively promoted in order to form a diffusion barrier. Some embodiments of the present invention may utilize filler material to fill the pores, voids, crevices, cracks, or channels that may be present on the surface of the subterranean formation. As used herein, the term "filler" or "filler material" means a particulate material that is capable of fitting within a pore, void, crevice, crack, or channel at or near the surface of a subterranean formation within the porous matrix of the individual particulates. Alternatively, a filler material may be used to generate and/or place the diffusion barrier. For example, a hydrophobic material may be used to coat a filler material, and the filler material may then generate a diffusion barrier (e.g., comprising a diageneous product) on the pipes and/or the surface of the subterranean formation. The filler material may fill the pores, voids, crevices, cracks, or channels on the subterranean surface, resulting in a surface that may be more hydrophobic than the original surface of the formation. Each of these materials and methods will be described in more detail below.

One embodiment of the present invention provides a method of providing a silica scale control additive in a subterranean formation that comprises a formed particulate pack. The method further comprises allowing the silica scale control additive to suppress silica scale build-up proximate the particulate pack. In some embodiments, this method may be useful in the recovery of fluids from the subterranean formation. The fluids being recovered may be a fluid previously introduced into the subterranean formation, an aqueous reservoir and/or formation fluid, a hydrocarbon fluid, or a combination thereof.

In order to quantify the mechanical strength of the particulates and permeability of the particulate pack, both before and after exposure to formation conditions and fluids, several test procedures may be utilized to determine various particulate properties. The first test method studies temperature-promoted diagenesis of a particulate pack by exposing a particulate pack to a flowing solution of simulated formation fluid at an approximate formation temperature. The second procedure studies stress/temperature-promoted diagenic growth through exposure of a particulate pack to a static flow environment under simulated formation pressures and temperatures. The mechanical strength of individual particulates may be measured before and after the test procedures to determine the percentage of particulate strength lost due to exposure to formation temperature or pressure. Alternatively, the permeability of the particulate pack may be measured before and after the temperature-promoted diagenesis test in order to determine a retained permeability value for the particulate pack. As would be understood by one of ordinary skill in the art with the benefit of this disclosure, expected subterranean formation conditions (e.g., temperature, pressure, formation fluid composition) for a selected subterranean formation will determine the appropriate formation conditions for test procedures.

In the temperature-promoted diagenesis test procedure, deionized water may first be heated to a test temperature of between about 200 degrees Fahrenheit (° F.) and about 600° F. by passing it through a heat exchanger coil. Simulated formation fluid may be formed by passing the deionized water through multiple packs of crushed formation material arranged in series such that the simulated formation fluid achieves chemical equilibrium with the soluble material in the packs. The number of formation packs required for the test may vary such that the simulated formation fluid leaving the last pack may be in equilibrium with the crushed formation material. Through experimentation, the typical number of formation packs may generally be between about 1 and about 10. Crushed formation material may be screened to remove fines and an approximately 8/35 mesh fraction may be used in the formation packs.

In an embodiment, once a simulated formation fluid in equilibrium with the crushed formation material is obtained, the simulated formation fluid may be directed to a column containing a particulate pack. The temperature in the particulate pack may be maintained at an approximate formation temperature between about 200° F. and about 600° F., which approximately corresponds to the temperature of the deionized water first entering the system. A flow rate of simulated formation fluid may be maintained at approximately 1 milliliter per minute during the test.

The flow test may be maintained for between about 10 to about 200 days, and in an embodiment, for at least about 20 days. After this time, the particulate pack may be disassembled in order to test the mechanical properties of individual particles, as discussed in more detail below. For example, surface and compositional analysis may be made after disassembly to determine what types of materials are being formed under the simulated formation conditions. A permeability test may also be performed at this time. In this test, the permeability of the particulate packs may be measured at room temperature prior to disassembly of the particulate pack. The measured permeability of the pack may then be compared with an initial permeability measurement made of the pack at room temperature before the pack is placed in the testing apparatus. Comparing the initial permeability measurement with the permeability measurement obtained after the pack is subjected to the test conditions may allow for a retained permeability to be calculated.

The stress/temperature-promoted diagenesis test method may involve the testing of the particulate pack under static flow conditions at approximate formation pressures and temperatures. In this method, a pack of particulates may be loaded in a test cell and filled with a salt solution. The test cell may be loaded with from between about 0.5 pounds per square foot ($lb/ft^2$) of particulates to about 3.0 $lb/ft^2$ of particulates. In an embodiment, an approximately 2% KCl solution may be used as the fluid medium. Formation wafers, either manufactured from formation core material or from rock outcrop material, may be placed above and below the particulate pack in the test column. The system may then be shut in and placed under simulated formation pressure and heated to approximate formation temperatures. In an embodiment of this method, the temperature may be maintained at between about 100° F. and about 550° F. In another embodiment, the temperature may be maintained at between about 100° F. and about 350° F. The pressure may be maintained at between about 2,000 psi and about 10,000 psi. In another embodiment, the pressure may be maintained at between about 5,000 psi and about 8,000 psi. In an embodiment, the test may be conducted for between about 1 to about 50 weeks, and in another embodiment, the test may be conducted for at least about 4 weeks (about 28 days).

Upon completion of the stress/temperature-promoted diagenesis test, the test cell may be disassembled and the particulate pack removed for testing. As with the flow test method, additional tests may also be performed at this time. For example, surface and compositional analysis may be made after disassembly to determine what types of materials are being formed under the simulated formation conditions. Alternatively, the resulting interstitial fluid may be analyzed to determine the relative solubility of the particulates under formation conditions.

Changes in the mechanical properties of the particulates obtained from either the stress/temperature-promoted diagenesis test or the temperature-promoted diagenesis test may be determined using a single-grain crush-strength analysis. The analysis may utilize a Weibull statistical analysis procedure based on a plurality of particulate crush samples. The crush test may be based on a uni-axial compressive point loading of a particle. Under a compressive loading in the uni-axial direction, a spherical particle may be under tension in directions perpendicular to the loading with a tensile stress, σ, calculated by $$\sigma = \frac{2.8F}{\pi d^2}$$

where d is the diameter of each particle and F is the load at failure.

A Weibull analysis may include a statistically significant number of crush samples, which may range from about 10 to about 50 individual crush samples, or from about 20 to about 40 individual crush samples. In an embodiment, a sample size of between about 25 and about 30 individual crush samples of particulates may be used in the analysis. All of the strength data points may then be sorted from low to high as $\sigma_1<\sigma_2<\sigma_3<\ldots<\sigma_N$, where N represents the total number of samples. A probability of failure may be calculated from the equation:

$$P_f = \left(\frac{\# - 0.5}{N}\right)$$

where, as before, N is the total number of samples, for example about 30 samples, and # is the index number for the sorted strength values (e.g., 1 through N). A linear plot may be obtained by plotting $$\ln\left(\ln\left(\frac{1}{1-P_f}\right)\right) \text{ vs } \ln(\sigma)$$

A Weibull distribution may be found by linear fitting and generating an equation:

$$\ln\left(\ln\left(\frac{1}{1-P_f}\right)\right) = m\ln\left(\frac{\sigma}{\sigma_0}\right)$$

where m is the Weibull modulus and $\sigma_0$ is the characteristic strength. The strength will tend to increase along with the reliability of the strength calculation when the $\sigma_0$ and m values increase. The characteristic strength changes in the particulates may then be determined. By comparing the characteristic strength of the particulates prior to exposure to the simulated formation fluid with the characteristic strength of the particulates after exposure to the simulated formation fluid, a retained strength value may be calculated from the equation:

$$\sigma_{0 retained} = \left(\frac{\sigma_{0 exposed}}{\sigma_{0 unexposed}}\right)$$

where, $\sigma_{0\ exposed}$ is the characteristic strength of the particles after exposure to the simulated formation fluid, and $\sigma_{0\ unexposed}$ is the characteristic strength of the particles prior to exposure. Similarly, a retained permeability may be calculated by dividing the permeability measured at the end of the temperature-promoted diagenesis test with the permeability measured at the beginning.

In an embodiment, a single set of test conditions may be utilized for comparison of different sets of particles comprising diffusion barriers and/or filler materials. The retained strength value is defined to be measured by the stress/temperature-promoted diagenesis test. In this method, a pack of particulates is loaded in a test column and filled with a salt solution comprising an approximately 2% KCl solution. The test cell is loaded with about 2 $lb/ft^2$ of particulates. Formation wafers are placed above and below the particulates in the test cell. The system is then shut in and placed under a pressure that is approximately equal to the pressure expected in the formation in which the particulates are expected to be placed. The temperature may be maintained at a temperature that is approximately equal to the formation temperature where the particulates are expected to be placed. For example, the system may be placed under simulated formation pressure of about 9000 psi and temperature of about 250° F. These conditions are then maintained for about 28 days.

Upon completion of the stress/temperature-promoted diagenesis test, the test cell is disassembled and the particulate matrix removed for testing. Changes in the mechanical properties of the particulates are obtained using particulates tested using the stress/temperature-promoted diagenesis test. The analysis utilizes a Weibull statistical analysis procedure based on a plurality of particulate crush samples, as discussed above. A single analysis includes a statistically significant number of samples, which may be between about 20 and about 40 samples, e.g., approximately 30 crushed samples of individual particles. However, in some instances, the sample size may vary such that the actual number of samples is smaller or larger in order to obtain a statistically significant number of samples. The characteristic strength changes in the particulates may then be determined. By comparing the characteristic strength of the particulates prior to exposure to the simulated formation fluid with the characteristic strength of the particulates after exposure to the simulated formation fluid, a retained strength value is calculated from the equation:

$$\sigma_{0retained} = \left( \frac{\sigma_{0exposed}}{\sigma_{0unexposed}} \right)$$

where, $\sigma_{0\ exposed}$ is the characteristic strength of the particles after exposure to the simulated formation fluid, and $\sigma_{0\ unexposed}$ is the characteristic strength of the particles prior to exposure.

Similarly, the retained permeability value of the particulate pack is defined to be measured by the temperature-promoted diagenesis test. In the temperature-promoted diagenesis test procedure, an initial permeability measurement is made of a particulate pack while the particulate pack is at room temperature. Deionized water is then heated to a test temperature of approximately 500° F. by passing it through a heat exchanger coil. Lower test temperatures may also be used depending on the specific particulate material and coating used. For example, one of ordinary skill in the art may determine that a lower test temperature is required in order to avoid thermal decomposition of the particulates, the diffusion barrier, or the filler material. Simulated formation fluid is formed by passing the deionized water through multiple packs of crushed formation material arranged in series. The number of formation packs required for the test may vary such that the simulated formation fluid leaving the last pack is in equilibrium with the crushed formation material at the flow rate used during the test of approximately 1 milliliter per minute. The typical number of formation packs is generally between about 2 and about 5. Crushed formation material is screened and an approximately 8/35 mesh fraction is used in the formation packs. The formation material is obtained by crushing a core withdrawn from a specific well during drilling or from dill cuttings obtained while a well is being drilled through a zone of interest.

The simulated formation fluid then is directed to a column containing a particulate pack. The temperature in the particulate pack is maintained at a temperature of about 500° F. A lower test temperature may be used depending on the specific particulate material and coating material used. For example, one of ordinary skill in the art may determine that a lower test temperature is required in order to avoid thermal decomposition of the particulates, the diffusion barrier, or the filler. A flow rate of simulated formation fluid is maintained at approximately 1 milliliter per minute during the test. The flow test is maintained for about 30 days. After this time, permeability of the particulate pack is measured prior to disassembly and after the particulate pack has been allowed to cool to room temperature, allowing for a retained permeability to be calculated from the equation:

$$Permeability_{retained} = \left( \frac{Permeability_{exposed}}{Permeability_{unexposed}} \right)$$

where, $Permeability_{exposed}$ is the permeability of the particles after exposure to the simulated formation fluid, and $Permeability_{unexposed}$ is the permeability of the particles prior to exposure.

Particulates prepared and tested according to the methods of the current invention using the characteristic conditions of the embodiment may exhibit a retained strength value of greater than about 20%. Alternatively, the particulates may exhibit a retained strength value of greater than about 60%. In still another embodiment, the particulates may exhibit a retained strength value of greater than about 80%. In yet another embodiment, the particulates may exhibit a retained strength value of greater than about 90%. In an embodiment, the particulates used to form a pack may be characterized by a retained permeability value of at least about 40%. In another embodiment, the particulates may be characterized by a retained permeability of at least about 60%. In still another embodiment, the particulates may be characterized by a retained permeability of at least about 80%. In some embodiments, the retained permeability may be at least about 99%.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing an acidic treatment fluid comprising:
a base fluid,
an acid, and
a silica scale control additive;
wherein the silica scale control additive comprises at least one substance selected from the group consisting of a polyaminoamide dendrimer, a polyethyleneimine, a carboxymethylinulin, a polyacrylate, a polyallylamine, a copolymer of polyacrylamide, a polyallyldimethylammonium chloride, any combination thereof, and any derivative thereof;
contacting at least a portion of a subterranean formation with the acidic treatment fluid in a remedial operation; and
allowing the acidic treatment fluid to interact with silica scale buildup in the subterranean formation so that at least a portion of the silica scale buildup is removed and a concentration of soluble silica in the treatment fluid is about 500 mg/L or more by weight after interacting with the silica scale buildup, whereby precipitation of new silica scale buildup from the treatment fluid is suppressed by the silica scale control additive.

2. The method of claim 1, wherein the acidic treatment fluid comprises at least one acid selected from the group consisting of hydrochloric acid, hydrofluoric acid, acetic acid, formic acid, citric acid, lactic acid, glycolic acid, sulfamic acid, tartaric acid, methanesulfonic acid, trichloroacetic acid, dichloroacetic acid, chloroacetic acid, fluoroboric acid, fluorophosphoric acid, hexafluorotitanic acid, phosphoric acid, any combinations thereof, and any derivatives thereof.

3. The method of claim 1, wherein the base fluid comprises at least one substance selected from the group consisting of an aqueous-based fluid, a hydrocarbon-based fluid, an emulsion, a gel, and derivatives thereof.

4. The method of claim 1, wherein the silica scale control additive has a concentration in the base fluid ranging between about 0.01% and about 15% by weight.

5. The method of claim 1, wherein the base fluid has a pH of less than or equal to about 4.5.

6. The method of claim 1, wherein the base fluid has a pH above 0 and less than 4.

7. A method comprising:
providing a treatment fluid comprising a base fluid and a silica scale control additive;
wherein the silica scale control additive has a concentration in the base fluid ranging between about 0.1% to about 5% by weight and comprises at least one substance selected from the group consisting of a polyaminoamide dendrimer, a polyethyleneimine, a carboxymethylinulin, a polyacrylate, a polyallylamine, a copolymer of polyacrylamide, a polyallyldimethylammonium chloride, any combination thereof, and any derivative thereof;
introducing the treatment fluid into at least a portion of a subterranean formation in a remedial operation; and
suppressing precipitation of silica scale in the subterranean formation with the silica scale control additive at a soluble silicon concentration of about 500 mg/L or above.

8. The method of claim 7, wherein the base fluid has a pH of less than or equal to about 4.5.

9. The method of claim 7, wherein the base fluid has a pH above 0 and less than 4.0.

10. The method of claim 7, wherein the base fluid comprises at least one substance selected from the group consisting of an aqueous-based fluid, a hydrocarbon-based fluid, an emulsion, a gel, a foamed fluid and derivatives thereof.

11. A method for reducing silica scale buildup in a subterranean formation, the method comprising:
placing an acidic treatment fluid comprising a base fluid and a silica scale control additive in the subterranean formation;
wherein the silica scale control additive comprises at least one substance selected from the group consisting of a polyaminoamide dendrimer, a polyethyleneimine, a carboxymethylinulin, a polyacrylate, a polyallylamine, a copolymer of polyacrylamide, a polyallyldimethylammonium chloride, any combination thereof, and any derivative thereof; and
forming soluble silica in the subterranean formation in a remedial operation;
wherein a concentration of soluble silica in the treatment fluid is about 500 mg/L or more by weight after forming the soluble silica, and precipitation of new silica scale buildup from the treatment fluid is suppressed by the silica scale control additive.

12. The method of claim 11, wherein the base fluid has a pH of less than or equal to about 4.5.

13. The method of claim 11, wherein the base fluid has a pH above 0 and less than 4.

* * * * *